(12) United States Patent
Sekiguchi et al.

(10) Patent No.: US 9,542,967 B2
(45) Date of Patent: Jan. 10, 2017

(54) MAGNETIC RECORDING MEDIUM

(71) Applicant: Sony Corporation, Tokyo (JP)

(72) Inventors: Noboru Sekiguchi, Miyagi (JP); Tomoe Ozaki, Miyagi (JP); Junichi Tachibana, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/568,423

(22) Filed: Dec. 12, 2014

(65) Prior Publication Data
US 2015/0194174 A1 Jul. 9, 2015

(30) Foreign Application Priority Data

Jan. 7, 2014 (JP) .................. 2014-001233

(51) Int. Cl.
| | |
|---|---|
| *G11B 5/708* | (2006.01) |
| *G11B 5/66* | (2006.01) |
| *G11B 5/65* | (2006.01) |
| *G11B 5/667* | (2006.01) |
| *G11B 5/64* | (2006.01) |
| *G11B 5/73* | (2006.01) |

(52) U.S. Cl.
CPC . *G11B 5/66* (2013.01); *G11B 5/64* (2013.01); *G11B 5/65* (2013.01); *G11B 5/656* (2013.01); *G11B 5/667* (2013.01); *G11B 5/7325* (2013.01)

(58) Field of Classification Search
None
See application file for complete search history.

(56) References Cited

U.S. PATENT DOCUMENTS

2006/0019128 A1* 1/2006 Tanaka ............... G11B 5/70
428/840.3
2011/0111257 A1* 5/2011 Kurokawa ........... G11B 5/732
428/800

FOREIGN PATENT DOCUMENTS

JP 2005-196885 7/2005

* cited by examiner

Primary Examiner — Holly Rickman
Assistant Examiner — Linda Chau
(74) Attorney, Agent, or Firm — K&L Gates LLP

(57) ABSTRACT

There is provided a magnetic recording medium including a surface having a longitudinal direction and a lateral direction. An arithmetic average roughness Ra, a ratio $PSD_{MD,short}/PSD_{TD,short}$, and a ratio $PSD_{MD,long}/PSD_{TD,long}$ on the surface satisfy $Ra \leq 3.0$ nm, $PSD_{MD,short}/PSD_{TD,short} \leq 0.65$, and $1.3 \leq PSD_{MD,long}/PSD_{TD,long} \leq 2.3$, in which $PSD_{MD,short}$ is an average value of PSD values in a range from 0.15 μm to 0.4 μm in the longitudinal direction of the surface, $PSD_{TD,short}$ is an average value of PSD values in a range from 0.15 μm to 0.4 μm in the lateral direction of the surface, $PSD_{MD,long}$ is an average value of PSD values in a range from 0.4 μm to 5.0 μm in the longitudinal direction of the surface, and $PSD_{TD,long}$ is an average value of PSD values in a range from 0.4 μm to 5.0 μm in the lateral direction of the surface.

20 Claims, 8 Drawing Sheets

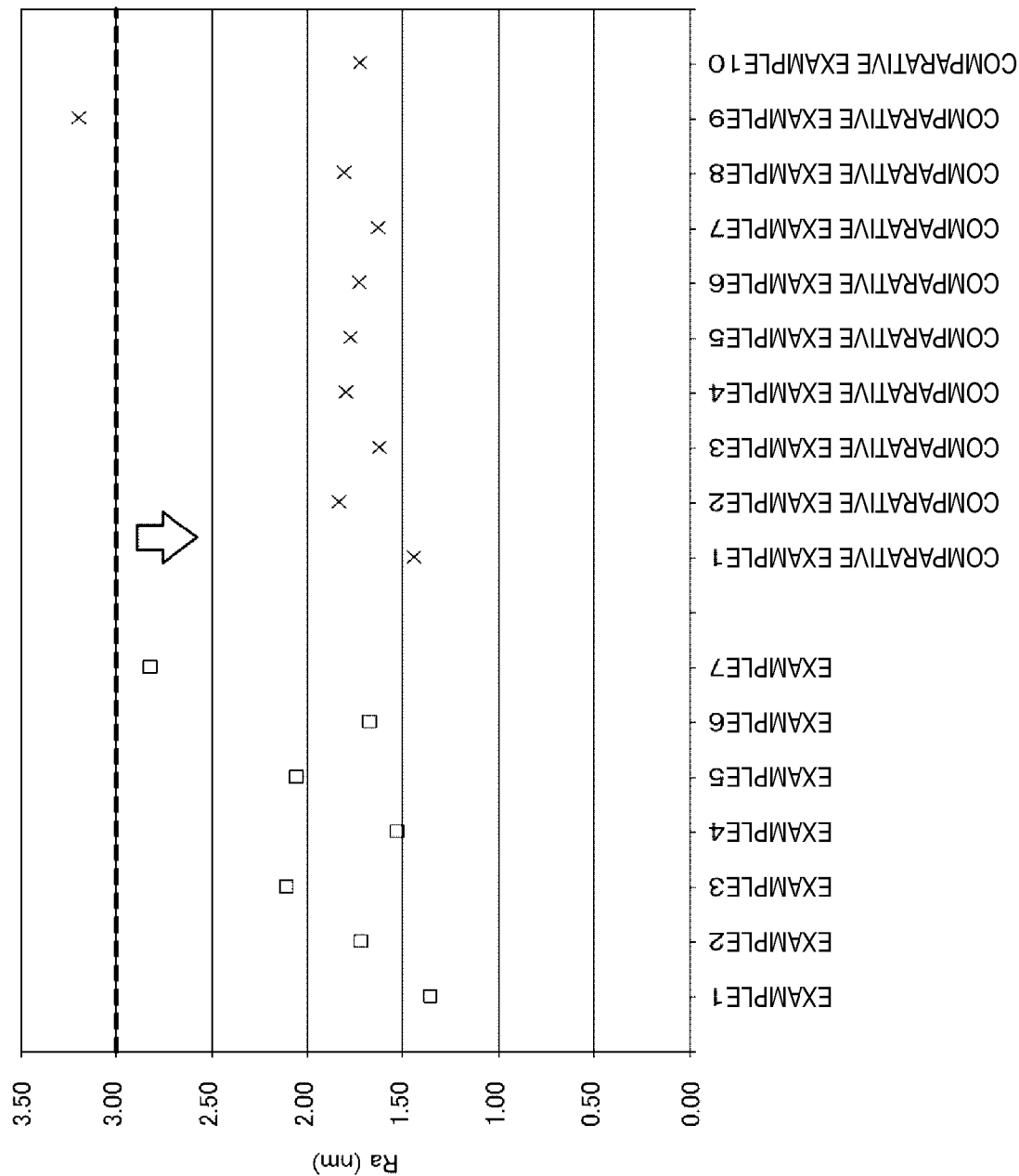

MAGNETIC RECORDING MEDIUM

CROSS REFERENCES TO RELATED APPLICATIONS

The present application claims priority to Japanese Priority Patent Application JP 2014-001233 filed in the Japan Patent Office on Jan. 7, 2014, the entire content of which is hereby incorporated by reference.

BACKGROUND

The present technique relates to a magnetic recording medium. More specifically, the present technique relates to a magnetic recording medium having a surface having a longitudinal direction and a lateral direction.

In recent years, a demand for an increase in the recording density of tape media for data storage has increased due to the development of the IT (information technology) society, the electronization of libraries, Public Record Offices, and the like, and the long-term storage of business documents.

As a high recording density magnetic tape, a magnetic recording medium in which a plurality of thin films are formed on a nonmagnetic base material by a sputtering method or the like has been proposed. For example, JP 2005-196885A discloses a magnetic recording medium in which at least an amorphous layer, a seed layer, a foundation layer, a magnetic layer, and a protective layer are successively formed on a nonmagnetic base material.

SUMMARY

It has been desired in the high recording density magnetic tape that the magnetic tape surface is smoothed in order to obtain good recording and reproducing properties. However, when the magnetic tape surface is smoothed, the friction increases, and therefore the travelling properties deteriorate, so that there is a tendency for the reliability to decrease. More specifically, it is difficult to achieve both recording and reproducing properties and reliability.

Therefore, it is desirable to provide a magnetic recording medium capable of achieving both recording and reproducing properties and reliability.

According to an embodiment of the present application, there is provided a magnetic recording medium including a surface having a longitudinal direction and a lateral direction. An arithmetic average roughness Ra, a ratio $PSD_{MD,short}/PSD_{TD,short}$, and a ratio $PSD_{MD,long}/PSD_{TD,long}$ on the surface satisfy the following relational expressions, $Ra \leq 3.0$ nm, $PSD_{MD,short}/PSD_{TD,short} \leq 0.65$, and $1.3 \leq PSD_{MD,long}/PSD_{TD,long} \leq 2.3$, in which $PSD_{MD,short}$ is an average value of PSD values in a range of 0.15 μm or more and 0.4 μm or less in the longitudinal direction of the surface, $PSD_{TD,short}$ is an average value of PSD values in a range of 0.15 μm or more and 0.4 μm or less in the lateral direction of the surface, $PSD_{MD,long}$ is an average value of PSD values in a range of 0.4 μm or more and 5.0 μm or less in the longitudinal direction of the surface, and $PSD_{TD,long}$ is an average value of PSD values in a range of 0.4 μm or more and 5.0 μm or less in the lateral direction of the surface.

As described above, the present technique can achieve both recording and reproducing properties and reliability.

Additional features and advantages are described herein, and will be apparent from the following Detailed Description and the figures.

BRIEF DESCRIPTION OF THE FIGURES

FIG. 10 is a view showing the arithmetic average roughness Ra of each of the magnetic tapes of Examples 1 to 7 and Comparative Examples 1 to 10.

DETAILED DESCRIPTION

Figure 1:
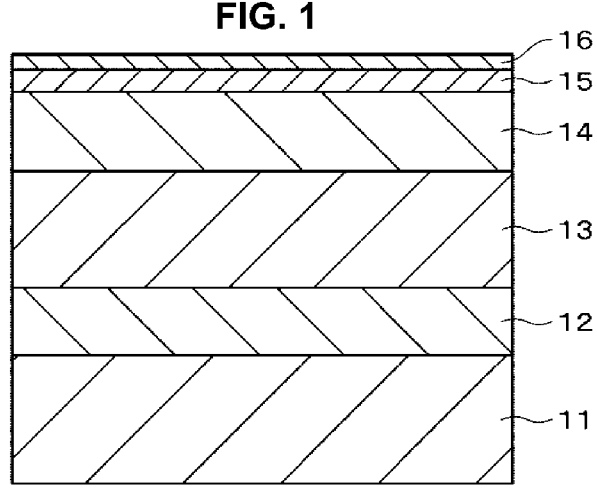
FIG. 1 is a cross sectional view schematically illustrating an example of the configuration of a vertical magnetic recording medium according to a first embodiment of the present technique.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

It is preferable in the present technique that a seed layer having an amorphous state and containing an alloy containing Ti and Cr is provided between a base substance and a foundation layer. Thus, influence of $O_2$ gas, $H_2O$, and the like adsorbing to the base substance surface on the foundation layer can be suppressed and the smoothness of the base substance surface can be improved.

In the present technique, each layer of the seed layer, the foundation layer, and a recording layer may have either a single layer structure or a multilayer structure. From the viewpoint of further improving the magnetic properties and/or the recording and reproducing properties of the magnetic recording medium, it is preferable to adopt the multilayer structure. When the manufacturing efficiency is taken into consideration, it is preferable to adopt a two-layer structure also among multilayer structures.

It is more preferable in the present technique that the magnetic recording medium further has a soft magnetic layer provided between the seed layer and the foundation layer. As the structure of the soft magnetic layer, both a single layer structure and a multilayer structure may be used and it is preferable to use a multilayer structure from the viewpoint of an improvement of the recording and reproducing properties. As the soft magnetic layer having a multilayer structure, one is preferable in which a first soft magnetic layer, an intermediate layer, and a second soft magnetic layer are provided and the intermediate layer is provided between the first soft magnetic layer and the second soft magnetic layer. When the magnetic recording medium further has the soft magnetic layer, it is preferable to further have another seed layer between the soft magnetic layer and the foundation layer.

It is preferable in the present technique that at least two layers of the seed layer, the foundation layer, and the recording layer are continuously formed by a Roll to Roll method and it is more preferable that all the three layers are continuously formed by the method. When the magnetic recording medium further has the soft magnetic layer, it is preferable that at least two layers of the seed layer, the soft magnetic layer, the foundation layer, and the recording layer are continuously formed by a Roll to Roll method and it is more preferable that all the four layers are continuously formed by the method.

Embodiments of the present technique are described in the following order.
1 First Embodiment (Example of Vertical Magnetic Recording Medium having Seed Layer Having Single layer Structure)
1.1 Outline
1.2 Configuration of Vertical Magnetic Recording Medium
1.3 Configuration of Sputtering Device
1.4 Method for Manufacturing Vertical Magnetic Recording Medium
1.5 Effect
2 Second Embodiment (Example of Vertical Magnetic Recording Medium Having Seed Layer Having Two-Layer Structure)
2.1 Configuration of Vertical Magnetic Recording Medium
2.2 Effect
3 Third Embodiment (Example of Vertical Magnetic Recording Medium Having Foundation Layer Having Two-Layer Structure)
3.1 Configuration of Vertical Magnetic Recording Medium
3.2 Effect
3.3 Modification
4 Fourth Embodiment (Example of Vertical Magnetic Recording Medium Further Having Soft Magnetic Underlayer Having Single Layer Structure)
4.1 Configuration of Vertical Magnetic Recording Medium
4.2 Effect
4.3 Modification
5 Fifth Embodiment (Example of Vertical Magnetic Recording Medium Further Having Soft Magnetic Underlayer Having Multilayer Structure)
5.1 Configuration of Vertical Magnetic Recording Medium
5.2 Effect
5.3 Modification 1. First Embodiment 1.1 Outline The present inventors conducted extensive examination in order to achieve both recording and reproducing properties and reliability (durability). First, as a result of examining the arithmetic average roughness Ra on the surface of a magnetic recording medium, the present inventors reached a finding that when the arithmetic average roughness Ra does not satisfy Ra≤3.0 nm, good recording and reproducing properties are not obtained.

Next, based on the premise that Ra satisfies Ra≤3.0 nm, the present inventors have attempted to achieve both recording and reproducing properties and reliability focusing on the power spectrum density (PSD) obtained by performing fast fourier transform (FFT) of the surface profile of the magnetic recording medium. Since the properties in the travelling direction are particularly important in the magnetic recording medium, there is no necessity of achieving equal surface properties in all the directions and the surface properties may be different in each of the longitudinal direction (MD direction) and the lateral direction (TD direction). Then, the present inventors conducted examination focusing on the PSD in the MD direction (hereinafter referred to as "$PSD_{MD1}$") of the medium surface and the PSD in the TD direction (hereinafter referred to as "$PSD_{TD1}$") of the medium surface. In this specification, the longitudinal direction of the magnetic recording medium is sometimes referred to as a MD (Machine Direction) direction and the width direction of the magnetic recording medium is sometimes referred to as a TD (Transverse Direction) direction.

Figure 9:
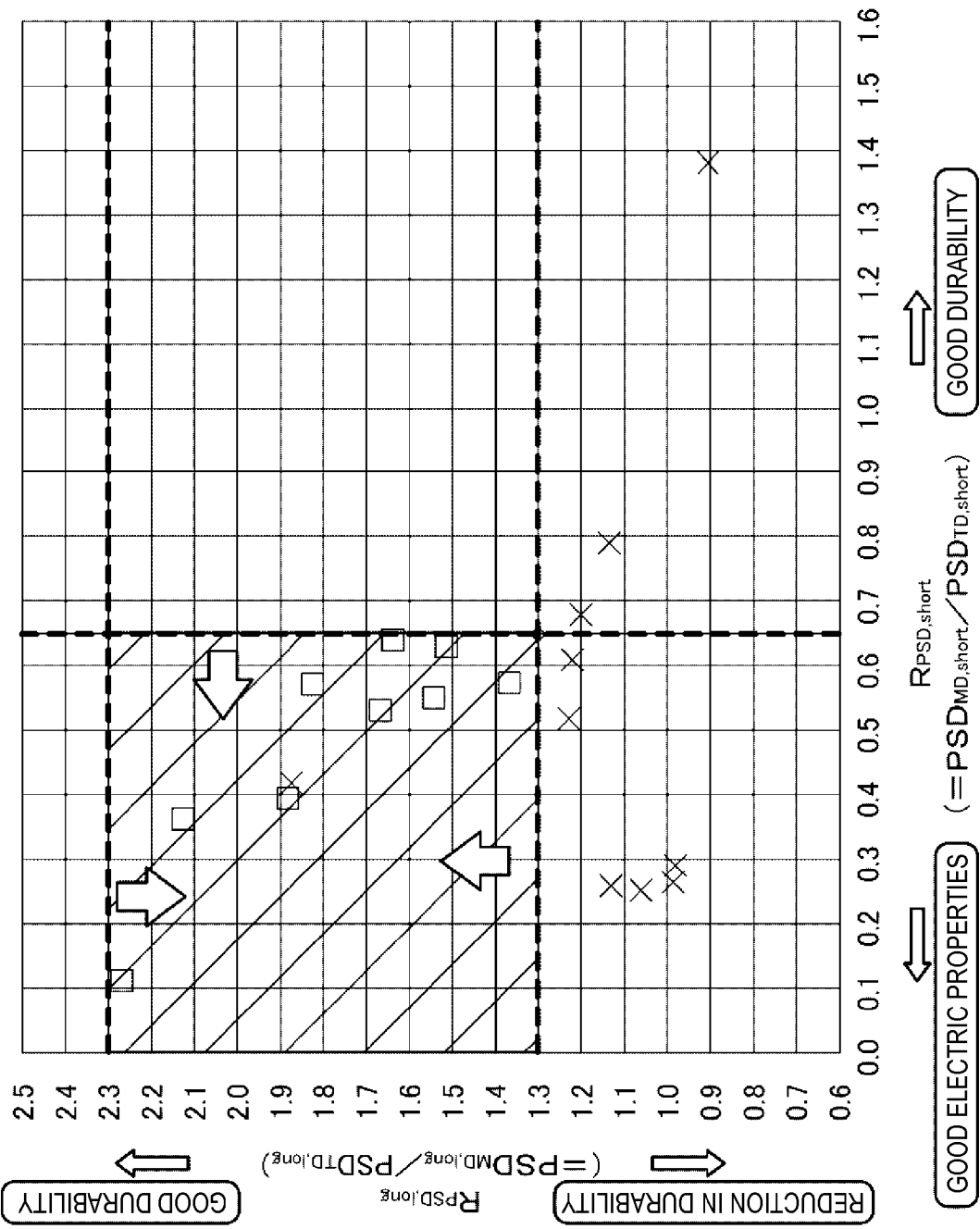
FIG. 9 is a view showing the ratio $R_{PSD,short}$ ($=PSD_{MD,short}/PSD_{TD,short}$) and the ratio $R_{PSD,long}$ ($=PSD_{MD,long}/PSD_{TD,long}$) of each of the magnetic tapes of Examples 1 to 7 and Comparative Examples 1 to 10.

First, the present inventors conducted the following examination focusing on the balance of the $PSD_{MD1}$ and the $PSD_{TD1}$ in a short wavelength region. More specifically, the present inventors conducted extensive examination focusing on the balance between the average value $PSD_{MD,short}$ of the PSD values in the short wavelength region in the MD direction of the medium surface and the average value $PSD_{TD,short}$ of the PSD values in the short wavelength region in the TD direction of the medium surface, i.e., the ratio $PSD_{MD,short}/PSD_{TD,short}$. As a result, the present inventors reached a finding that it is difficult to achieve both recording and reproducing properties and reliability only by adjusting the ratio $PSD_{MD,short}/PSD_{TD,short}$. Specifically, the present inventors reached the following finding (FIG. 9). When $0.65<PSD_{MD,short}/PSD_{TD,short}$ is satisfied, the travelling direction component of the magnetic recording medium of the surface rough degree is strong and the recording and reproducing properties deteriorate but the reliability is good. On the other hand, when $PSD_{MD,short}/PSD_{TD,short}≤0.65$ is satisfied, the recording and reproducing properties improve but the reliability deteriorates.

Then, the present inventors conducted the following examination focusing on the balance between the $PSD_{MD1}$ and the $PSD_{TD1}$ in a long wavelength region which hardly contributes to the recording and reproducing properties and is effective for friction in order to secure reliability in the range of $PSD_{MD,short}/PSD_{TD,short}≤0.65$ in which good recording and reproducing properties are obtained. More specifically, the present inventors conducted extensive examination focusing on the balance between the average value $PSD_{MD,long}$ of the PSD values in the long wavelength region in the MD direction of the medium surface and the average value $PSD_{TD,long}$ of the PSD values in the long wavelength region in the TD direction of the medium surface, i.e., the ratio $PSD_{MD,long}/PSD_{TD,long}$. As a result, the present inventors reached a finding that, by setting the ratio to $1.3≤PSD_{MD,long}/PSD_{TD,long}≤2.3$ in the range of $PSDMD_{short}/PSDTD_{short}≤0.65$, the travelling direction component of the magnetic recording medium of the surface roughness can be strengthened and the friction can be reduced and also the influence on the recording and reproducing properties can be suppressed, and thus, both recording and reproducing properties and reliability can be achieved (FIG. 9).

Thus, the present inventors have accomplished the magnetic recording medium according to this embodiment.

1.2 Configuration of Magnetic Recording Medium

FIG. 1 is a cross sectional view schematically illustrating an example of the configuration of the magnetic recording medium according to the first embodiment of the present technique. The magnetic recording medium is a so-called single layer vertical magnetic recording medium and has a base substance 11 and a laminated film provided on the surface of the base substance 11. The laminated film has a seed layer 12 provided on the surface of the base substance 11, a foundation layer 13 provided on the surface of the seed layer 12, a magnetic recording layer 14 provided on the surface of the foundation layer 13, a protective layer 15 provided on the surface of the magnetic recording layer 14, and a topcoat layer 16 provided on the surface of the protective layer 15. The laminated film is preferably formed by a sputtering method. In this specification, a recording medium not having a soft magnetic underlayer is referred to as a "single layer vertical magnetic recording medium" and a recording medium having a soft magnetic underlayer is referred to as a "two-layer vertical magnetic recording medium".

The magnetic recording medium is suitably used as storage media for data archives for which a demand is expected to further increase in the future. The magnetic recording medium can realize a surface recording density of 10 times or more that of a current coating type magnetic tape for storage, i.e., surface recording density of 50 Gb/in$^2$, for example. When constituting a general linear recording type data cartridge employing the magnetic recording medium having such a surface recording density, mass recording of 50 TB or more per data cartridge can be achieved. The magnetic recording medium is suitably used for a recording and reproducing device employing a ring type recording head and a giant magnetoresistive (GMR) type reproducing head.

Medium Surface

The magnetic recording medium has a surface having a longitudinal direction (MD direction) and a lateral direction (TD direction). The arithmetic average roughness Ra, the ratio $PSD_{MD,short}/PSD_{TD,short}$ ($=R_{PSD,short}$), and the ratio $PSD_{MD,long}/PSD_{TD,long}$ ($=R_{PSD,long}$) on the medium surface satisfy the following relational expressions.

$$Ra \leq 3.0 \text{ nm}$$

$$PSD_{MD,short}/PSD_{TD,short} \leq 0.65$$

$$1.3 \leq PSD_{MD,long}/PSD_{TD,long} \leq 2.3.$$

($PSD_{MD,short}$: Average value of PSD values in the range of 0.15 μm or more and 0.4 μm or less in the MD direction of the medium surface, $PSD_{TD,short}$: Average value of PSD values in the range of 0.15 μm or more and 0.4 μm or less in the TD direction of the medium surface, $PSD_{MD,long}$: Average value of PSD values in the range of 0.4 μm or more and 5.0 μm or less in the MD direction of the medium surface, and $PSD_{TD,long}$: Average value of PSD values in the range of 0.4 μm or more and 5.0 μm or less in the TD direction of the medium surface).

When the relational expressions above are satisfied, both recording and reproducing properties and reliability can be achieved. Specifically, in the case of 3.0 nm<Ra, the recording and reproducing properties decrease. In the case of 0.65<$PSD_{MD,short}/PSD_{TD,short}$, the recording and reproducing properties decrease. In the case of $PSD_{MD,long}/PSD_{TD,long}$<1.3, the durability decreases. In the case of 2.3<$PSD_{MD,long}/PSD_{TD,long}$, the recording and reproducing properties decrease.

Base Substance

The base substance 11 serving as the base material is, for example, a long film and has a surface having a longitudinal direction (MD direction) and a lateral direction (TD direction). The base substance 11 has an irregular surface having microscopic irregularities, for example. In this case, the surface of the laminated film is preferably an irregular surface following the irregular surface of the base substance 11. This is because the medium surface satisfying the relational expressions above is easily formed. As the base substance 11, it is preferable to use a nonmagnetic base substance having flexibility. As a material of the nonmagnetic base substance, a flexible polymer resin material for use in usual magnetic recording media can be used, for example. Specific examples of such a polymer material include polyesters, polyolefins, cellulose derivatives, vinyl resin, polyimides, polyamides, polycarbonate, or the like.

Seed Layer

The seed layer 12 is provided between the base substance 11 and the foundation layer 13. It is preferable that the seed layer 12 contains an alloy containing Ti and Cr and the alloy has an amorphous state. Specifically, it is preferable for the seed layer 12 to contain an alloy containing Ti and Cr and to have an amorphous state. The alloy may further contain O (oxygen). The oxygen is impurity oxygen contained in a small proportion in the seed layer 12 when forming the seed layer 12 by a film forming method, such as a sputtering method, for example. Herein, the "seed layer" does not refer to an intermediate layer having a crystal structure similar to that of the foundation layer 13 and provided for crystal growth and refers to an intermediate layer which improves the vertical orientation properties of the foundation layer 13 due to the flatness and the amorphous state of the seed layer 12. The "alloy" means at least one of a solid solution containing Ti and Cr, an eutectic crystal, an intermetallic compound, and the like. The "amorphous state" means that halo is observed by an electron diffraction method and the crystal structure may not be specified.

The seed layer 12 containing an alloy containing Ti and Cr and having an amorphous state has effects of suppressing the influence of $O_2$ gas and $H_2O$ adsorbing to the base substance 11 and also reducing the irregularities of the surface of the base substance 11 to form a metallic smooth surface on the surface of the base substance 11. Due to the effects, the vertical orientation properties of the foundation layer 13 are improved. When the state of the seed layer 12 is set to a crystal state, the columnar shape formed in the crystal growth becomes clear and the irregularities of the surface of the base substance 11 are emphasized, so that the crystal orientation of the foundation layer 13 deteriorates.

The proportion of O (oxygen) based on the total amount of Ti, Cr, and O contained in the seed layer 12 is preferably 15 atomic % (at %) or less and more preferably 10 atomic % or less. When the proportion of oxygen exceeds 15 atomic %, a $TiO_2$ crystal generates, which exerts an influence on the formation of the crystal nucleus of the foundation layer 13 to be formed on the surface of the seed layer 12, so that the orientation properties of the foundation layer 13 greatly decrease.

The proportion of Ti based on the total amount of Ti and Cr contained in the seed layer 12 is preferably in the range of 30 atomic % or more and 100 atomic % or less and more preferably in the range of 50 atomic % or more and 100 atomic % or less. When the proportion of Ti is less than 30%, the (100) plane of the body-centered cubiclattice (bcc) structure of Cr is oriented, so that the orientation properties of the foundation layer 13 to be formed on the surface of the seed layer 12 decreases.

The proportion of the elements above can be determined as follows. Etching by ion beams is performed from the side of the topcoat layer 16 of the magnetic recording medium, the outermost surface of the etched seed layer 12 is subjected to an analysis by Auger electron spectroscopy, and then the average atomic number ratio based on the film thickness is defined as the proportion of the element. Specifically, the three elements of Ti, Cr, and O are analyzed, and then the element amount in terms of percentage ratio is identified.

The alloy contained in the seed layer 12 may further contain elements other than Ti and Cr as additional elements. Examples of the additional elements include one or more elements selected from the group consisting of Nb, Ni, Mo, Al, W, and the like, for example.

Foundation Layer

It is preferable for the foundation layer 13 to have the same crystal structure as that of the magnetic recording layer 14. When the magnetic recording layer 14 contains a Co alloy, it is preferable that the foundation layer 13 contains a material having the same hexagonal close-packed (hcp) structure as that of the Co alloy and that the c-axis of the structure is vertically oriented (i.e., film thickness direction) to the film surface. This is because the orientation properties of the magnetic recording layer 14 can be improved and the grating constants of the foundation layer 13 and the magnetic recording layer 14 can be relatively favorably matched. As the material having the hexagonal close-packed (hcp) structure, materials containing Ru are preferably used and specifically a Ru simple substance or a Ru alloy is preferable. Examples of the Ru alloy include Ru alloy oxides, such as Ru—$SiO_2$, Ru—$TiO_2$, or Ru—$ZrO_2$, for example.

Magnetic Recording Layer

The magnetic recording layer 14 is preferably a granular magnetic layer containing a Co alloy from the viewpoint of improving recording density. This granular magnetic layer contains ferromagnetic crystal particles containing a Co alloy and a nonmagnetic grain boundary (nonmagnetic material) surrounding the ferromagnetic crystal particles. More specifically, the granular magnetic layer contains columns (columnar crystal) containing a Co alloy and a nonmagnetic grain boundary (for example, oxides, such as $SiO_2$) which surrounds the columns and which magnetically isolate each column. This structure can constitute the magnetic recording layer 14 having the structure in which each column is magnetically isolated.

The Co alloy has the hexagonal close-packed (hcp) structure, in which the c-axis is vertically oriented (film thickness direction) to the film surface. As the Co alloy, a CoCrPt alloy at least containing Co, Cr, and Pt is preferably used. The CoCrPt alloy is not particularly limited and the CoCrPt alloy may further contain additional elements. Examples of the additional elements include one or more elements selected from the group consisting of Ni, Ta, and the like, for example.

The nonmagnetic grain boundary surrounding the ferromagnetic crystal particles contains a nonmagnetic metal material. Herein, the metal includes semimetal. As the nonmagnetic metal material, at least one of a metal oxide and a metal nitride can be used, for example. From the viewpoint of more stably maintaining the granular structure, a metal oxide is preferably used. Examples of the metal oxide include a metal oxide containing at least one or more elements selected from the group consisting of Si, Cr, Co, Al, Ti, Ta, Zr, Ce, Y, Hf, and the like and a metal oxide containing at least a Si oxide (i.e., $SiO_2$) is preferable. Specific examples include $SiO_2$, $Cr_2O_3$, CoO, $Al_2O_3$, $TiO_2$, $Ta_2O_5$, $ZrO_2$, $HfO_2$, or the like. Examples of the metal nitride include a metal nitride containing at least one or more elements selected from the group consisting of Si, Cr, Co, Al, Ti, Ta, Zr, Ce, Y, Hf, and the like. Specific examples include SiN, TiN, or AlN. In order to more stably maintain the granular structure, it is preferable for the nonmagnetic grain boundary to contain a metal oxide among the metal nitrides and the metal oxides.

From the viewpoint of achieving a further improvement of the signal-noise ratio (SNR), it is preferable for the CoCrPt alloy contained in the ferromagnetic crystal particles and the Si oxide contained in the nonmagnetic grain boundary to have the average composition shown in the following expression. This is because the influence of a demagnetizing field can be suppressed and also the saturation magnetization Ms capable of securing a sufficient reproduction output can be realized and a high SNR can be secured.

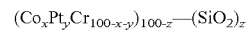

$$(Co_xPt_yCr_{100-x-y})_{100-z}\text{—}(SiO_2)_z$$

(In the expression, x, y, and z are values in the range of 69≤X≤72, 12≤y≤16, and 9≤Z≤12, respectively.)

The composition above can be determined as follows. Etching by ion beams is performed from the side of the topcoat layer 16 of the magnetic recording medium, the outermost surface of the etched magnetic recording layer 14 is subjected to an analysis by Auger electron spectroscopy, and then the average atomic number ratio based on the film thickness is defined as the proportion of the element. Specifically, the five elements of Co, Pt, Cr, Si, and O are analyzed, and then the element amount in terms of percentage ratio is identified.

The magnetic recording medium according to this embodiment is a single layer magnetic recording medium which does not have an underlayer (soft magnetic underlayer) containing a soft magnetic material. In this kind of the magnetic recording medium, when the influence of a demagnetizing field in the vertical direction resulting from the magnetic recording layer 14 is large, sufficient recording in the vertical direction tends to become difficult. The demagnetizing field becomes larger in proportion to the saturation magnetization Ms of the magnetic recording layer 14. Therefore, in order to suppress the demagnetizing field, it is preferable to reduce the saturation magnetization Ms. However, when the saturation magnetization Ms becomes small, the remaining magnetization Mr becomes small, so that a reproduction output decreases. Therefore, the materials contained in the magnetic recording layer 14 are preferably selected from the viewpoint of achieving both the suppression of the influence of the demagnetizing field (i.e., reduction in the saturation magnetization Ms) and the remaining magnetization Mr capable of securing a sufficient reproduction output. In the average composition of the expression above, both these properties can be achieved and a high SNR can be secured.

It is preferable that at least two adjacent layers among the seed layer 12, the foundation layer 13, and the magnetic recording layer 14 are continuously formed by a Roll to Roll method and it is more preferable that all the three layers are continuously formed by a Roll to Roll method. This is because the magnetic properties and the recording and reproducing properties can be further improved.

Protective Layer

The protective layer 15 contains a carbon material or a silica dioxide ($SiO_2$), for example, and preferably contains a carbon material from the viewpoint of the film strength of the protective layer 15. Examples of the carbon material include graphite, diamond-like carbon (DLC), diamond, or the like, for example.

Topcoat Layer

The topcoat layer 16 contains a lubricant, for example. As the lubricant, silicone lubricants, hydrocarbon lubricants, fluorinated hydrocarbon lubricants, or the like can be used, for example.

1.3 Configuration of Sputtering Device

Figure 2:
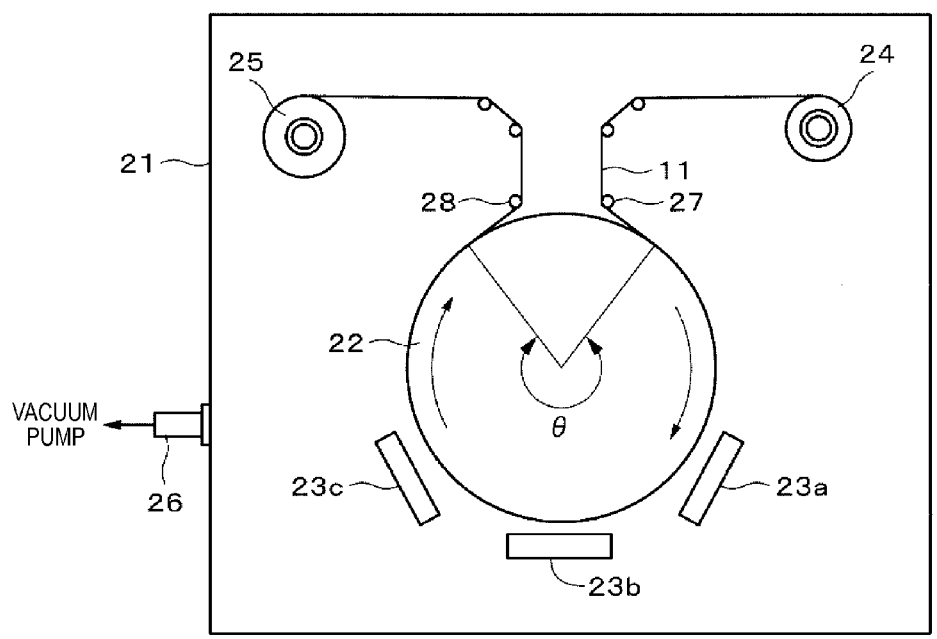
FIG. 2 is a schematic view illustrating an example of the configuration of a sputtering device for use in manufacturing of the vertical magnetic recording medium according to the first embodiment of the present technique.

FIG. 2 is a schematic view illustrating an example of the configuration of a sputtering device for use in manufacturing of the magnetic recording medium according to the first embodiment of the present technique. The sputtering device is a continuous take-up sputtering device for use in the film formation of the seed layer 12, the foundation layer 13, and the magnetic recording layer 14 and has a film formation chamber 21, a drum 22 which is a metal can (body of rotation), cathodes 23a to 23c, a supply reel 24, a take-up reel 25, and a plurality of guide rolls 27 and 28 as illustrated in FIG. 2. The sputtering device is a DC (direct current) magnetron sputtering type device, for example, but the sputtering system is not limited to this type.

The film formation chamber 21 is connected to a vacuum pump, which is not illustrated, through an exhaust port 26. The atmosphere in the film formation chamber 21 is set to a predetermined vacuum degree by the vacuum pump. In the film formation chamber 21, the drum 22, the supply reel 24, and the take-up reel 25 which are configured to be rotatable are disposed. In the film formation chamber 21, a plurality of guide rolls 27 for guiding the feed of the base substance 11 between the supply reel 24 and the drum 22 are provided and also a plurality of guide rolls 28 for guiding the feed of the base substance 11 between the drum 22 and the take-up reel 25 are provided. In sputtering, the base substance 11 unwound from the supply reel 24 is taken up by the reel 25 through the guide rolls 27, the drum 22, and the guide rolls 28. The drum 22 has a cylindrical shape and the base substance 11 having a long and narrow rectangular shape is fed along the circumferential surface having a cylindrical shape of the drum 22. The drum 22 is provided with a cooling mechanism which is not illustrated and is cooled to about −20° C., for example, in sputtering. In the film formation chamber 21, a plurality of cathodes 23a to 23c are disposed facing the circumferential surface of the drum 22. A target is set to each of the cathodes 23a to 23c. Specifically, a target for forming the sheet layer 12, a target for forming the foundation layer 13, and a target for forming the magnetic recording layer 14 are set to the cathodes 23a, 23b, and 23c, respectively. By the cathodes 23a to 23c, two or more kinds of films, i.e., the sheet layer 12, the foundation layer 13, and the magnetic recording layer 14 are simultaneously formed.

The atmosphere of the film formation chamber 21 in sputtering is set to about $1 \times 10^{-5}$ Pa to $5 \times 10^{-5}$ Pa, for example. The film thickness and the properties (for example, magnetic properties) of the seed layer 12, the foundation layer 13, and the magnetic recording layer 14 can be controlled by adjusting the tape line speed of taking up the base substance 11, the pressure of Ar gas to be introduced in sputtering (sputtering gas pressure), the throwing power, and the like. The tape line speed is preferably in the range of about 1 m/min to 10 m/min. The sputtering gas pressure is preferably in the range of about 0.1 Pa to 5 Pa. The throwing power amount is preferably in the range of about 30 $mW/mm^2$ to 150 $mW/mm^2$.

When continuously forming the seed layer 12, the foundation layer 13, and the magnetic recording layer 14 on the base material 11 having a small thickness containing a polymer material, it is preferable that all the following film formation conditions (1) to (4) are satisfied:

(1) The temperature of the drum 22 is preferably 10° C. or less and more preferably −20° C. or less. Herein, the temperature of the drum 22 is measured by setting a temperature sensor for body of rotation utilizing a resistance temperature sensor, a linear resistance, a thermistor, and the like on the drum 22.

(2) An angle range θ in a region where the base substance 11 contacts of the circumferential surface of the drum 22 is preferably 220° or more and less than 360° and more preferably 270° or more and less than 360°. Herein, the angle range means an angle range in the circumferential direction of the circumferential surface of the drum 22 to the central axis of the cylindrical drum 22 as illustrated in FIG. 2.

(3) The tension per mm length in width of the base substance 11 is preferably 4 g/mm or more and more preferably 4 g/mm or more and 20 g/mm or less. Herein, the tension is obtained by measuring a load applied to both sides of the guide rolls 27 and 28 as a reference with a strain gauge transducer (tension sensor).

(4) The highest value among the dynamic rates of the sheet layer 12, the foundation layer 13, and the magnetic recording layer 14 is preferably 70 nm·m/min or less. Herein, the dynamic rate is a product of the film formation film thickness and the feeding speed.

When satisfying the film formation conditions (1) to (4) above, damages of the base substance 11 caused by radiant heat from plasma in sputtering can be suppressed. More specifically, partial deformation of the base substance 11 and, in a more serious case, cutting of the base substance 11 during the film formation, for example, can be suppressed. When the upper limit of the tension is set to 20 g/mm or less in the film formation condition (3) above, the formation of cracks in the film laminated on the base substance 11 caused by the tension after taking up a magnetic tape can be suppressed.

In the sputtering device having the above-described configuration, the seed layer 12, the foundation layer 13, and the magnetic recording layer 14 can be continuously or discontinuously formed by a Roll to Roll method and are preferably continuously formed from the viewpoint of a further improvement of the magnetic properties and the recording and reproducing properties. When adopting the continuous film formation, it is preferable that at least two adjacent layers among the seed layer 12, the foundation layer 13, and the magnetic recording layer 14 are continuously formed by a Roll to Roll method and it is more preferable that all the three layers are continuously formed by a Roll to Roll method.

Herein, the continuous film formation means film formation in which while the lower layer (seed layer 12 or foundation layer 13) and the upper layer (foundation layer 13 or magnetic recording layer 14) connected to each other are formed, the lower layer surface state is not changed, more specifically, no force is applied to the lower layer surface. Specific examples of the continuous film formation process include a process of successively forming the seed layer 12, the foundation layer 13, and the magnetic recording layer 14 on the surface of the travelling base substance 11 by one process of unwinding the base substance 11 from the supply reel 24, and then taking up the same by the reel 25 through the drum 22.

On the other hand, the discontinuous film formation means film formation in which while the lower layer (seed layer 12 or foundation layer 13) and the upper layer (foundation layer 13 or magnetic recording layer 14) connected to each other are formed, the lower layer surface state is changed, more specifically, a certain force is applied to the lower layer surface. Specific examples of the discontinuous film formation process include the following process. More specifically, the base substance 11 is unwound from the supply reel 24, and then a lower layer is formed on the surface of the base substance 11 on the drum 22 to be taken up by the take-up reel 25. Then, the base substance 11 is unwound from the take-up reel 25 again, an upper layer is formed on the surface of the base substance 11 on the drum 22, and then the base substance 11 is taken up by the supply reel 24. In this process, when the base substance 11 is taken up by the take-up reel 25 and when the base substance 11 is unwound from the take-up reel 25, the lower layer surface contacts the plurality of guide rolls 28 and also when the base substance 11 is taken up by the take-up reel 25, the lower layer surface contacts the back surface of the base substance 11 taken up onto the same. Therefore, changes are caused in the lower layer surface state.

1.4 Method for Manufacturing Magnetic Recording Medium

The magnetic recording medium according to the first embodiment of the present technique can be manufactured as follows, for example.

First, the seed layer 12, the foundation layer 13, and the magnetic recording layer 14 are formed on the base substance 11 using the sputtering device illustrated in FIG. 2. Specifically, the films are formed as follows. First, the film formation chamber 21 is evacuated until the pressure reaches a predetermined pressure. Thereafter, the targets set to the cathodes 23a to 23c are sputtered while introducing process gas, such as Ar gas, into the film formation chamber 21 to thereby successively form the seed layer 12, the foundation layer 13, and the magnetic recording layer 14 on the surface of the travelling base substance 11.

It is preferable to form at least adjacent two layers among the seed layer 12, the foundation layer 13, and the magnetic recording layer 14 on the surface of the travelling base substance 11 by one process of unwinding the base substance 11 from the supply reel 24, and then taking up the same by the reel 25 through the drum 22 and it is more preferable to continuously form all the three layers. When the adjacent two layers (seed layer 12 and foundation layer 13) are formed by one process of unwinding the base substance 11 from the supply reel 24, and then taking up the same by the reel 25 through the drum 22, the remaining one layer (magnetic recording layer 14) is formed on the drum 22 in another process of unwinding the base substance 11 from the take-up reel 25, and then taking up the same by the supply reel 24 again.

Next, the protective layer 15 is formed on the surface of the magnetic recording layer 14. As the formation method of the protective layer 15, a chemical vapor deposition (CVD) method or a physical vapor deposition (PVD) method can be used, for example.

Next, a lubricant, for example, is applied to the surface of the protective layer 15 to form the topcoat layer 16. As the application method of the lubricant, various application methods, such as gravure coating and dip coating, can be used, for example.

Thus, the magnetic recording medium illustrated in FIG. 1 is obtained.

1.5 Effect

In the magnetic recording medium according to the first embodiment, the arithmetic average roughness Ra, the ratio $PSD_{MD,short}/PSD_{TD,short}$, and the ratio $PSD_{MD,long}/PSD_{TD,long}$ on the medium surface satisfy the following relational expressions. Thus, both the recording and reproducing properties and the reliability can be achieved.

$$Ra \leq 3.0 \text{ nm}$$

$$PSD_{MD,short}/PSD_{TD,short} \leq 0.65$$

$$1.3 \leq PSD_{MD,long}/PSD_{TD,long} \leq 2.3$$

It is preferable for the magnetic recording medium according to the first embodiment to have the following configurations and effects (1) and (2).

(1) Between the base substance 11 and the foundation layer 13, the seed layer 12 having an amorphous state and containing an alloy containing Ti and Cr is provided. Thus, the influence of $O_2$ gas, $H_2O$, and the like adsorbing to the base substance 11 on the foundation layer 13 can be suppressed and also a metallic smooth surface can be formed on the surface of the base substance 11.

(2) The proportion of Ti based on the total amount of Ti and Cr contained in the seed layer 12 is set to be 30 atomic % or more and 100 atomic % or less. Thus, the orientation of the (100) plane of the bcc structure of Cr can be controlled.

Due to the fact that the magnetic recording medium has the configuration and effects (1) and (2) above, the orientation properties of the foundation layer 13 and the magnetic recording layer 14 can be improved and outstanding magnetic properties can be achieved. Therefore, an improvement of the medium performance, such as an increase in output and a reduction in noise, can be realized.

In the magnetic recording medium according to the first embodiment, when the seed layer 12 contains impurity oxygen, it is preferable for the magnetic recording medium to further have the following configuration and effect (3).

(3) The proportion of 0 based on the total amount of Ti, Cr, and O contained in the seed layer 12 is preferably set to be 15 atomic % or less. Thus, the generation of a $TiO_2$ crystal can be suppressed and the influence on the formation of the crystal nucleus of the foundation layer 13 to be formed on the surface of the seed layer 12 can be suppressed.

Due to the fact that the magnetic recording medium further has the configuration and effect (3) above, even in the case where the seed layer 12 contains impurity oxygen, the orientation properties of the foundation layer 13 and the magnetic recording layer 14 can be improved and outstanding magnetic properties can be achieved.

2 Second Embodiment

2.1 Configuration of Magnetic Recording Medium

Figure 3:
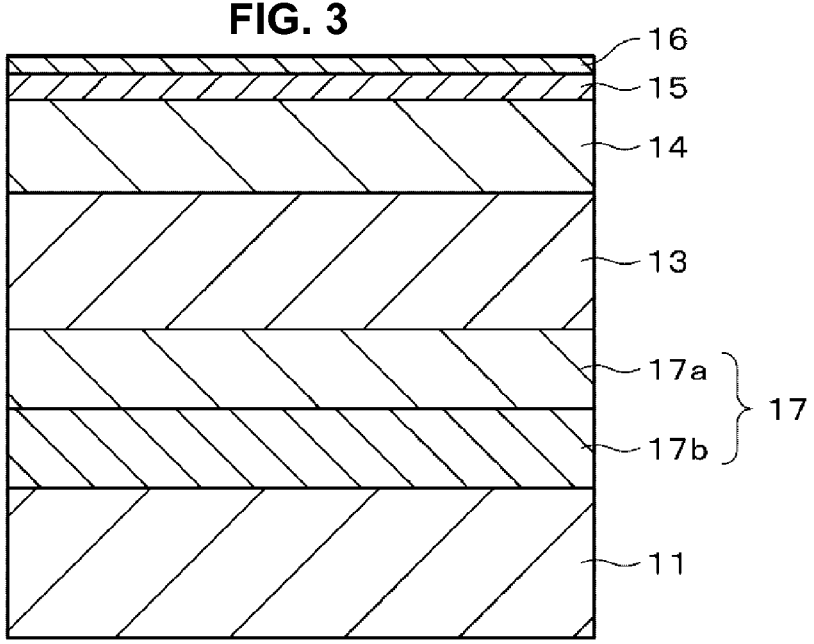
FIG. 3 is a cross sectional view schematically illustrating an example of the configuration of a vertical magnetic recording medium according to a second embodiment of the present technique.

FIG. 3 is a cross sectional view schematically illustrating an example of the configuration of a magnetic recording medium according to a second embodiment of the present technique. The magnetic recording medium according to this second embodiment is different from the magnetic recording medium according to the first embodiment in that a seed layer 17 having a two-layer structure is provided as illustrated in FIG. 3. In the second embodiment, the same components are designated by the same reference numerals as those of the first embodiment and the description is omitted.

The seed layer 17 has a first seed layer (upper seed layer) 17a and a second seed layer (lower seed layer) 17b. The first seed layer 17a is provided on the foundation layer 13 side and the second seed layer 17b is provided on the base substance 11 side. For the second seed layer 17b, the same one as the seed layer 12 in the first embodiment can be used. The first seed layer 17a contains a material whose composition is different from that of the second seed layer 17b, for example. Specific examples of the material include NiW, Ta, or the like. The first seed layer 17a can also be regarded as an intermediate layer provided between the second seed layer 17b and the foundation layer 13 instead of a seed layer.

2.2 Effect

Due to the fact that the magnetic recording medium has the seed layer 17 having a two-layer structure, the orientation properties of the foundation layer 13 and the magnetic recording layer 14 can be further improved and the magnetic properties can be further improved.

3 Third Embodiment

3.1 Configuration of Magnetic Recording Medium

Figure 4:
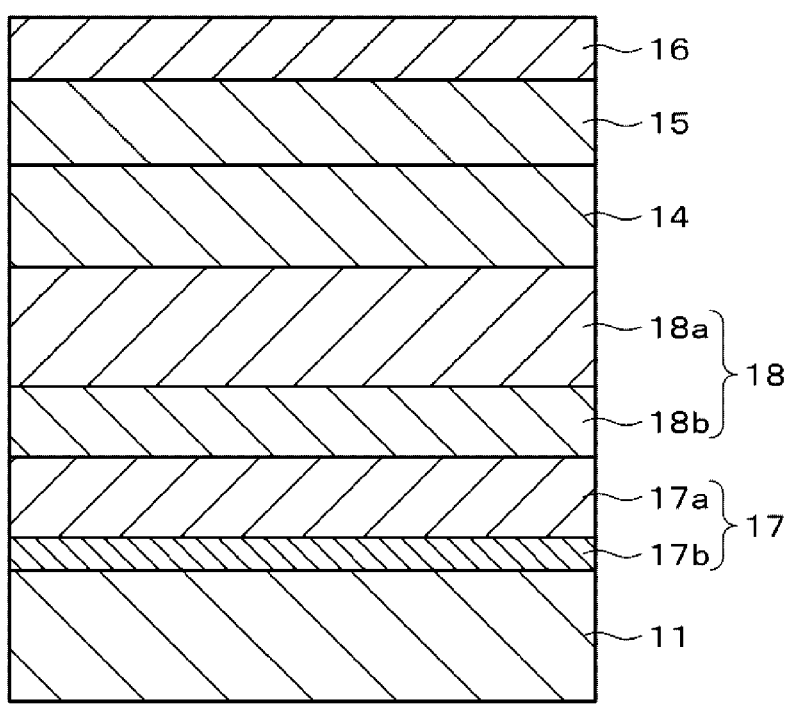
FIG. 4 is a cross sectional view schematically illustrating an example of the configuration of a vertical magnetic recording medium according to a third embodiment of the present technique.

FIG. 4 is a cross sectional view schematically illustrating an example of the configuration of a magnetic recording medium according to a third embodiment of the present technique. The magnetic recording medium according to this third embodiment is different from the magnetic recording medium according to the second embodiment in that a foundation layer 18 having a two-layer structure is provided as illustrated in FIG. 4. In the third embodiment, the same components are designated by the same reference numerals as those of the second embodiment and the description is omitted.

The foundation layer 18 has a first foundation layer (upper foundation layer) 18a and a second foundation layer (lower foundation layer) 18b. The first foundation layer 18a is provided on the magnetic recording layer 14 side and the second foundation layer 18b is provided on the seed layer 17 side.

As materials of both the first foundation layer 18a and the second foundation layer 18b, the same materials as those of the foundation layer 13 in the first embodiment can be used. However, the first foundation layer 18a and the second foundation layer 18b are different in the target effects, and therefore the sputtering conditions of the layers are varied.

More specifically, it is important for the first foundation layer 18a to have a film structure which promotes the granular structure of the magnetic recording layer serving as the upper layer thereof and it is important for the second foundation layer 18b to have a film structure having high crystal orientation properties.

3.2 Effect

Due to the fact that the magnetic recording medium has the foundation layer 18 having a two-layer structure, the orientation properties and the granular constitutive property of the magnetic recording layer 14 can be further improved and the magnetic properties can be further improved.

3.3 Modification

In the magnetic recording medium according to the third embodiment, a seed layer having a single layer structure may be provided in place of the seed layer 17 having a two-layer structure. As the seed layer having a single layer structure, the seed layer 12 in the first embodiment can be used.

4 Fourth Embodiment

4.1 Configuration of Magnetic Recording Medium

Figure 5:
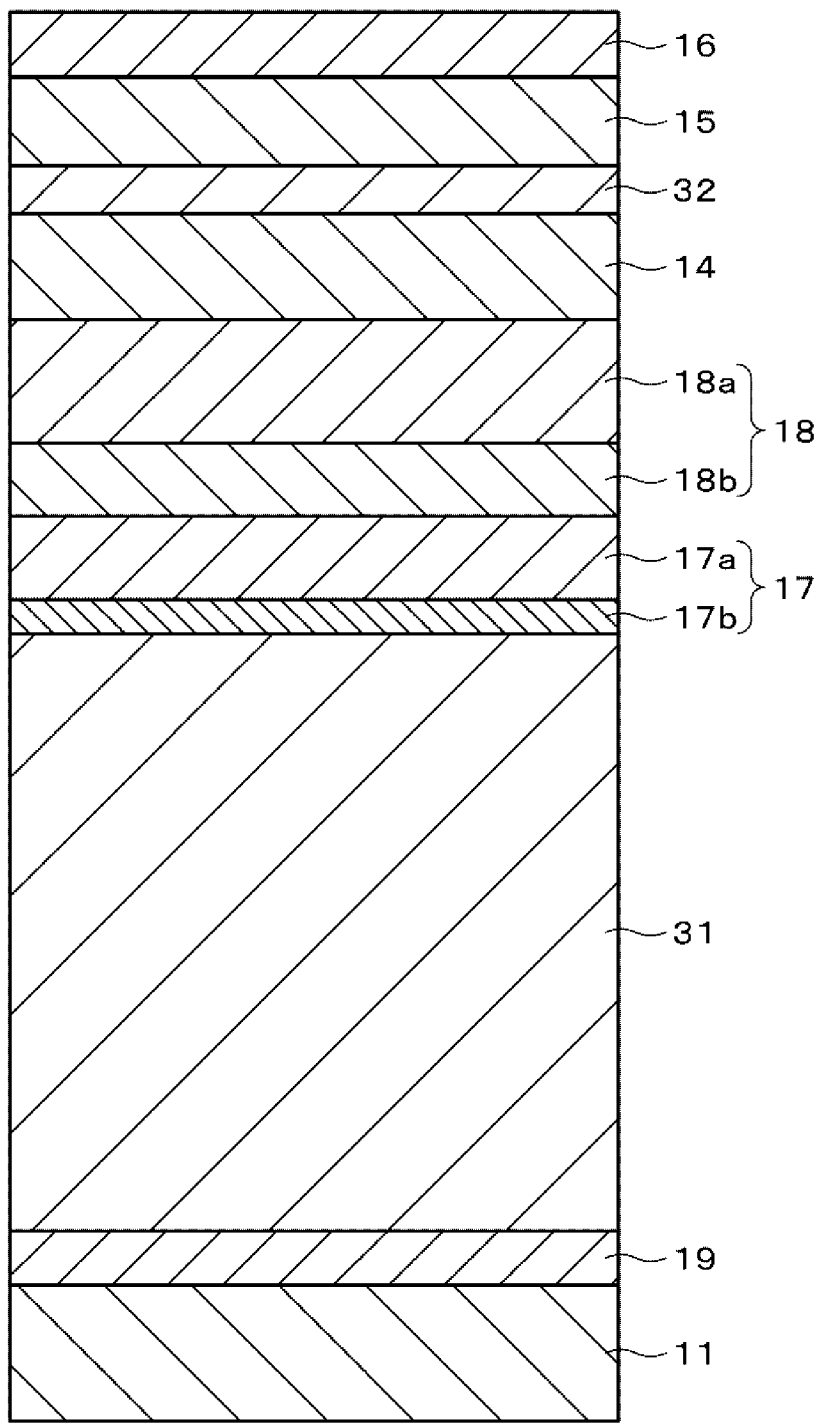
FIG. 5 is a cross sectional view schematically illustrating an example of the configuration of a vertical magnetic recording medium according to a fourth embodiment of the present technique.

FIG. 5 is a cross sectional view schematically illustrating an example of the configuration of a magnetic recording medium according to a fourth embodiment of the present technique. The magnetic recording medium according to this fourth embodiment is a so-called two-layer vertical magnetic recording medium and is different from the magnetic recording medium according to the third embodiment in that a seed layer 19 and a soft magnetic underlayer (hereinafter referred to as "SUL") 31 is provided between the base substance 11 and the seed layer 17 as illustrated in FIG. 5. The seed layer 19 is provided on the base substance 11 side and the SUL 31 is provided on the seed layer 17 side. The magnetic recording medium according to this fourth embodiment is suitably used in a recording and reproducing device employing a single pole type (SPT) recording head and a tunnel magnetoresistive (TMR) type reproducing head. In the fourth embodiment, the same components are designated by the same reference numerals as those of the third embodiment and the description is omitted.

As the seed layer 19, the same one as the seed layer 12 in the first embodiment can be used.

The film thickness of the SUL 31 is preferably 40 nm or more and more preferably 40 nm or more and 140 nm or less. When the film thickness is less than 40 nm, there is a tendency for the recording and reproducing properties to decrease. On the other hand, when the film thickness exceeds 140 nm, a reduction in the crystal orientation properties of the foundation layer 18 due to coarsening of crystal grains of the SUL film becomes remarkable and also the film formation time of the SUL 31 is prolonged, which may cause a reduction in productivity. The SUL 31 contains a soft magnetic material of an amorphous state. As the soft magnetic material, Co materials, Fe materials, or the like can be used, for example. Examples of the Co materials include CoZrNb, CoZrTa, CoZrTaNb, and the like, for example. Examples of the Fe materials include FeCoB, FeCoZr, FeCoTa, and the like, for example.

Since the SUL 31 has an amorphous state, the SUL 31 does not have a role of promoting the epitaxial growth of a layer to be formed on the SUL 31 but is desired not to disturb the crystal orientation of the foundation layer 18 to be formed on the SUL 31. To that end, it is necessary for the SUL 31 to have a microscopic structure in which the soft magnetic material does not form a column. However, when the influence of degassing of moisture or the like from the base substance 11 is large, the soft magnetic material is coarsened and disturbs the crystal orientation of the foundation layer 18 to be formed on the SUL 31. In order to suppress the influence thereof, it is important to provide the seed layer 19 on the surface of the base substance 11. In particular, when using a film containing a polymer material to which a large amount of moisture and gas, such as oxygen, adsorb is used as the base substance 11, it is important to provide the seed layer 19 in order to suppress the influence thereof.

It is preferable to further have a CAP layer (stack layer) 32 between the recording layer 14 and the protective layer 15. The lamination structure having the magnetic recording layer 14 having the granular structure and the CAP layer 32 is generally referred to as coupled granular continuous (CGC) structure. The film thickness of the CAP layer 32 is preferably 4 nm or more and 12 nm or less. By selecting the film thickness of the CAP layer 32 in the range of 4 nm or more and 12 nm or less, better recording and reproducing properties can be obtained. A CoCrPt material is contained. Examples of the CoCrPt material include CoCrPt, CoCrPtB, materials (CoCrPt-metal oxide, CoCrPtB-metal oxide) obtained by further adding metal oxide to CoCrPt and CoCrPtB, and the like, for example. As the metal oxide to be added, at least one kind selected from the group consisting of Si, Ti, Mg, Ta, Cr, and the like can be used, for example. Specific examples thereof include $SiO_2$, $TiO_2$, MgO, $Ta_2O_5$, $Cr_2O_3$, a mixture of two or more kinds thereof, and the like.

In the magnetic recording medium according to the fourth embodiment, it is preferable that the seed layer 19, the SUL 31, the first and second seed layers 17a and 17b, the first and second foundation layers 18a and 18b, and the magnetic recording layer 14 are all continuously formed by a Roll to Roll method. This is because the magnetic properties and the recording and reproducing properties can be further improved.

4.2 Effect

In the magnetic recording medium according to the fourth embodiment, by providing the SUL 31 under the magnetic recording layer 14 which is a vertical magnetic layer, the SUL 31 plays a role of reducing the generation of a magnetic pole in the top layer of the magnetic recording layer 14 to suppress a demagnetizing field caused by the generation of a magnetic pole and also guiding a head magnetic flux into the SUL 31 to assist the generation of a sharp head magnetic field. Moreover, since the seed layer 19 is provided between the base substance 11 and the SUL 31, the coarsening of the soft magnetic material contained in the SUL 31 can be suppressed. More specifically, the disorder of the crystal orientation in the foundation layer 18 can be suppressed. Therefore, in the magnetic recording medium having a surface recording density higher than that of the first embodiment, good recording and reproducing properties can be realized.

When a structure in which a CAP layer 32 is provided on the magnetic recording layer 14 having the granular structure is adopted, magnetic coupling due to exchange interaction is generated between the magnetic recording layer 14 and the CAP layer 32, and then the inclination of a M-H loop around Hc is steepened due to the effect, so that recording can be easily performed. In usual, when the inclination of the M-H loop is steepened only by the magnetic recording layer 14, an increase in noise is observed. However, in the case of this structure, a recording structure involving noise generation can maintain a low noise structure, and therefore a structure in which the noise is low and recording is easily performed can be realized.

4.3 Modification

In the magnetic recording medium according to the fourth embodiment, a seed layer having a single layer structure may be provided in place of the seed layer 17 having a two-layer structure. As the seed layer having a single layer structure, the seed layer 12 in the first embodiment can be used. A foundation layer having a single layer structure may be provided in place of the foundation layer 18 having a two-layer structure. As the foundation layer having a single layer structure, the foundation layer 13 in the first embodiment can be used.

5 Fifth Embodiment

5.1 Configuration of Magnetic Recording Medium

Figure 6:
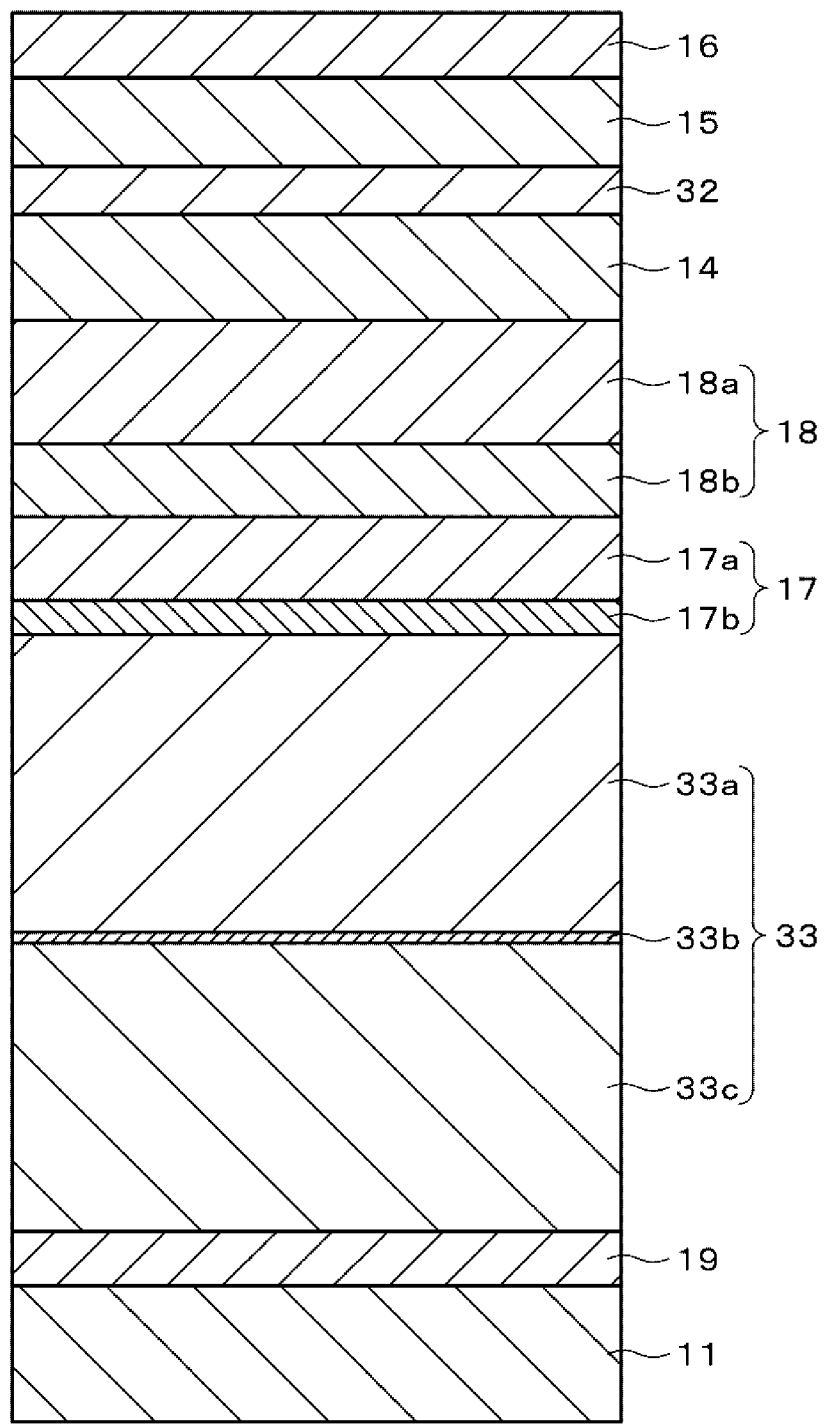
FIG. 6 is a cross sectional view schematically illustrating an example of the configuration of a vertical magnetic recording medium according to a fifth embodiment of the present technique.

FIG. 6 is a cross sectional view schematically illustrating an example of the configuration of a magnetic recording medium according to a fifth embodiment of the present technique. The magnetic recording medium according to this fifth embodiment is different from the magnetic recording medium according to the fourth embodiment in that an antiparallel coupled SUL (hereinafter referred to as "APC-SUL") 33 is provided as illustrated in FIG. 6. In the fifth embodiment, the same components are designated by the same reference numerals as those of the fourth embodiment and the description is omitted.

The APC-SUL 33 has a structure in which two soft magnetic layers 33a and 33c are laminated through a thin intermediate layer 33b, and magnetization is positively coupled in an antiparallel manner utilizing the exchange coupling through the intermediate layer 33b. The film thickness of each of the soft magnetic layers 33a and 33c is preferably almost the same. The total film thickness of the soft magnetic layers 33a and 33c is preferably 40 nm or more and more preferably 40 nm or more and 70 nm or less. When the total film thickness is less than 40 nm, there is a tendency for the recording and reproducing properties to decrease. On the other hand, when the total film thickness exceeds 70 nm, the film formation time of the APC-SUL 33 is prolonged, which may cause a reduction in productivity. Materials of the soft magnetic layers 33a and 33c are preferably the same. As the material, the same materials as those of the SUL 31 in the fourth embodiment can be used. The film thickness of the intermediate layer 33b is, for example, 0.8 nm or more and 1.4 nm or less, preferably 0.9 nm or more and 1.3 nm or less, and more preferably about 1.1 nm. By selecting the film thickness of the intermediate layer 33b in the range of 0.9 nm or more and 1.3 nm or less, better recording and reproducing properties can be obtained. As the material of the intermediate layer 33b, V, Cr, Mo, Cu, Ru, Rh, and Re are mentioned and Ru is particularly preferably contained.

5.2 Effect

In the magnetic recording medium according to the fifth embodiment, since the APC-SUL 33 is used, the soft magnetic layer 33a which is an upper layer portion and the soft magnetic layer 33c which is a lower layer portion are exchange-coupled in an antiparallel manner and the total magnetization of the upper and lower layers is zero in the residual magnetization state. Thus, the generation of spike-like noise, which is generated when the magnetic domain in the APC-SUL 33 moves, can be suppressed. Therefore, the recording and reproducing properties can be further improved.

5.3 Modification

In the magnetic recording medium according to the fifth embodiment, a seed layer and/or a foundation layer having a single layer structure may be provided in the same manner as in the magnetic recording medium according to the modification of the fourth embodiment.

EXAMPLES

Hereinafter, the present technique is specifically described with reference to Examples but the present technique is not limited only to Examples.

Examples 1 to 7

First, as a polymer film, a polymer film was prepared which has microscopic irregularities in the surface in which the arithmetic average roughness Ra and the ratios $R_{PSD,short}$ (=$PSD_{MD,short}$/$PSD_{TD,short}$) and $R_{PSD,long}$ (=$PSD_{MD,long}$/$PSD_{TD,long}$) satisfy the following relational expressions.

$Ra \leq 3.0$ nm $R_{PSD,short} \leq 0.65$ $1.3 \leq R_{PSD,long} \leq 2.3$

Next, a plurality of thin films were laminated on the surface of the prepared polymer film in such a manner as to follow the shape of the microscopic irregularities of the surface. Thus, the shape of the microscopic irregularities of the surface of the polymer film was almost maintained on the surface of the laminated film. A film formation process of each thin film is described below.

Film Formation Process of First TiCr Seed Layer

First, a TiCr seed layer was formed with a thickness of 5 nm on the polymer film as a nonmagnetic base substance under the following film formation conditions:
 Sputtering method: DC magnetron sputtering method
 Target: $Ti_{50}Cr_{50}$ target
 Ultimate vacuum: $5\times10^{-5}$ Pa
 Gas type: Ar
 Gas pressure: 0.5 Pa.

Film Formation Process of First Soft Magnetic Layer

First, a CoZrNb layer was formed with a thickness of 20 nm as a first soft magnetic layer on the TiCr seed layer under the following film formation conditions:
 Sputtering method: DC magnetron sputtering method
 Target: CoZrNb target
 Gas type: Ar
 Gas pressure: 0.1 Pa.

Film Formation Process of Ru Intermediate Layer

Next, an Ru intermediate layer was formed with a thickness in the range of 0.8 nm to 1.1 nm on the CoZrNb layer under the following film formation conditions:
 Sputtering method: DC magnetron sputtering method
 Target: Ru target
 Gas type: Ar
 Gas pressure: 0.3 Pa.

Film Formation Process of Second Soft Magnetic Layer

Next, a CoZrNb layer was formed with a thickness of 20 nm as a second soft magnetic layer on the Ru intermediate layer under the following film formation conditions:
 Sputtering method: DC magnetron sputtering method
 Target: CoZrNb target
 Gas type: Ar
 Gas pressure: 0.1 Pa.

Film Formation Process of Second TiCr Seed Layer

Next, a second TiCr seed layer was formed with a thickness of 2.5 nm on the CoZrNb layer under the following film formation conditions:
 Sputtering method: DC magnetron sputtering method
 Target: $Ti_{50}Cr_{50}$ target
 Ultimate vacuum: $5\times10^{-5}$ Pa
 Gas type: Ar
 Gas pressure: 0.5 Pa.

Film Formation Process of NiW Seed Layer

Next, a NiW seed layer was formed with a thickness of 10 nm on the second TiCr seed layer under the following film formation conditions:
 Sputtering method: DC magnetron sputtering method
 Target: NiW target
 Ultimate vacuum: $5\times10^{-5}$ Pa
 Gas type: Ar
 Gas pressure: 0.5 Pa.

Film Formation Process of First Ru Foundation Layer

Next, a first Ru foundation layer was formed with a thickness of 10 nm on the NiW seed layer under the following film formation conditions:
 Sputtering method: DC magnetron sputtering method
 Target: Ru target
 Gas type: Ar
 Gas pressure: 0.5 Pa.

Film Formation Process of Second Ru Foundation Layer

Next, a second Ru foundation layer was formed with a thickness of 20 nm on the first Ru foundation layer under the following film formation conditions:
 Sputtering method: DC magnetron sputtering method
 Target: Ru target
 Gas type: Ar
 Gas pressure: 1.5 Pa.

Film Formation Process of Magnetic Recording Layer

Next, a (CoCrPt)—($SiO_2$) magnetic recording layer was formed with a thickness of 20 nm on the second Ru foundation layer under the following film formation conditions:
 Sputtering method: DC magnetron sputtering method
 Target: $(Co_{70}Cr_{15}Pt_{10})_{90}$—$(SiO_2)_{10}$ target
 Gas type: Ar
 Gas pressure: 1.5 Pa.

Film Formation Process of CAP Layer

Next, a CoPtCrB layer as a CAP layer was formed with a thickness of 8 nm on the (CoCrPt)—($SiO_2$) magnetic recording layer under the following film formation conditions:
 Sputtering method: DC magnetron sputtering method
 Target: CoPtCrB target
 Gas type: Ar
 Gas pressure: 1.5 Pa.

Film Formation Process of Protective Layer

Next, a protective layer containing carbon was formed with a thickness of 5 nm on the CoPtCrB layer under the following film formation conditions:

Sputtering method: DC magnetron sputtering method
Target: Carbon target
Gas type: Ar
Gas pressure: 1.0 Pa.

Film Formation Process of Topcoat Layer

Next, a lubricant was applied onto the protective layer to form a topcoat layer on the protective layer.

Thus, a magnetic tape which is a vertical magnetic recording medium was obtained.

Comparative Examples 1 to 4, 8, and 10

Magnetic tapes were obtained in the same manner as in Example 1, except preparing a polymer film which has microscopic irregularities in the surface in which the arithmetic average roughness Ra and the ratios $R_{PSD,short}$ and $R_{PSD,long}$ satisfy the following relational expressions as a polymer film.

Ra≤3.0 nm $R_{PSD,short}$≤0.65

$R_{PSD,long}$≤1.3

Comparative Examples 5 to 7

Magnetic tapes were obtained in the same manner as in Example 1, except preparing a polymer film which has microscopic irregularities in the surface in which the arithmetic average roughness Ra and the ratios $R_{PSD,short}$ and $R_{PSD,long}$ satisfy the following relational expressions as a polymer film.

Ra≤3.0 nm 0.65<$R_{PSD,short}$ $R_{PSD,long}$≤1.3

Comparative Example 9

A magnetic tape was obtained in the same manner as in Example 1, except preparing a polymer film which has microscopic irregularities in the surface in which the arithmetic average roughness Ra and the ratios $R_{PSD,short}$ and $R_{PSD,long}$ satisfy the following relational expressions as a polymer film.

3.0 nm<Ra $R_{PSD,short}$≤0.65

1.3≤$R_{PSD,long}$≤2.3

The ratios $R_{PSD,short}$ and $R_{PSD,long}$, the arithmetic average roughness Ra, and the friction of the surface of the magnetic tapes of Examples 1 to 7 and Comparative Examples 1 to 10 obtained as described above were evaluated as follows.

Evaluation of Ratios $R_{PSD,short}$, $R_{PSD,long}$

First, the surface of the magnetic tapes was observed under an atomic force microscope (AFM), and two-dimensional (2D) surface profile data were obtained. Measurement was performed.

The AFM used for the measurement is described below:
Dimension 3100 manufactured by Digital Instruments
Cantilever: NCH-10T manufactured by Nano World.

The measurement conditions of the AFM are described below.

Measurement area: 30 μm×30 μm
Resolution: 512×512
Scan direction of Probe of AFM: MD Direction (Longitudinal Direction) of magnetic tape Measurement mode: Tapping mode
Scan ratio: 1 Hz Next, the obtained 2D surface profile data were subjected to the following filter processing:
Flatten: Third order
Planefit: Third order only in MD direction.

Figure 7:
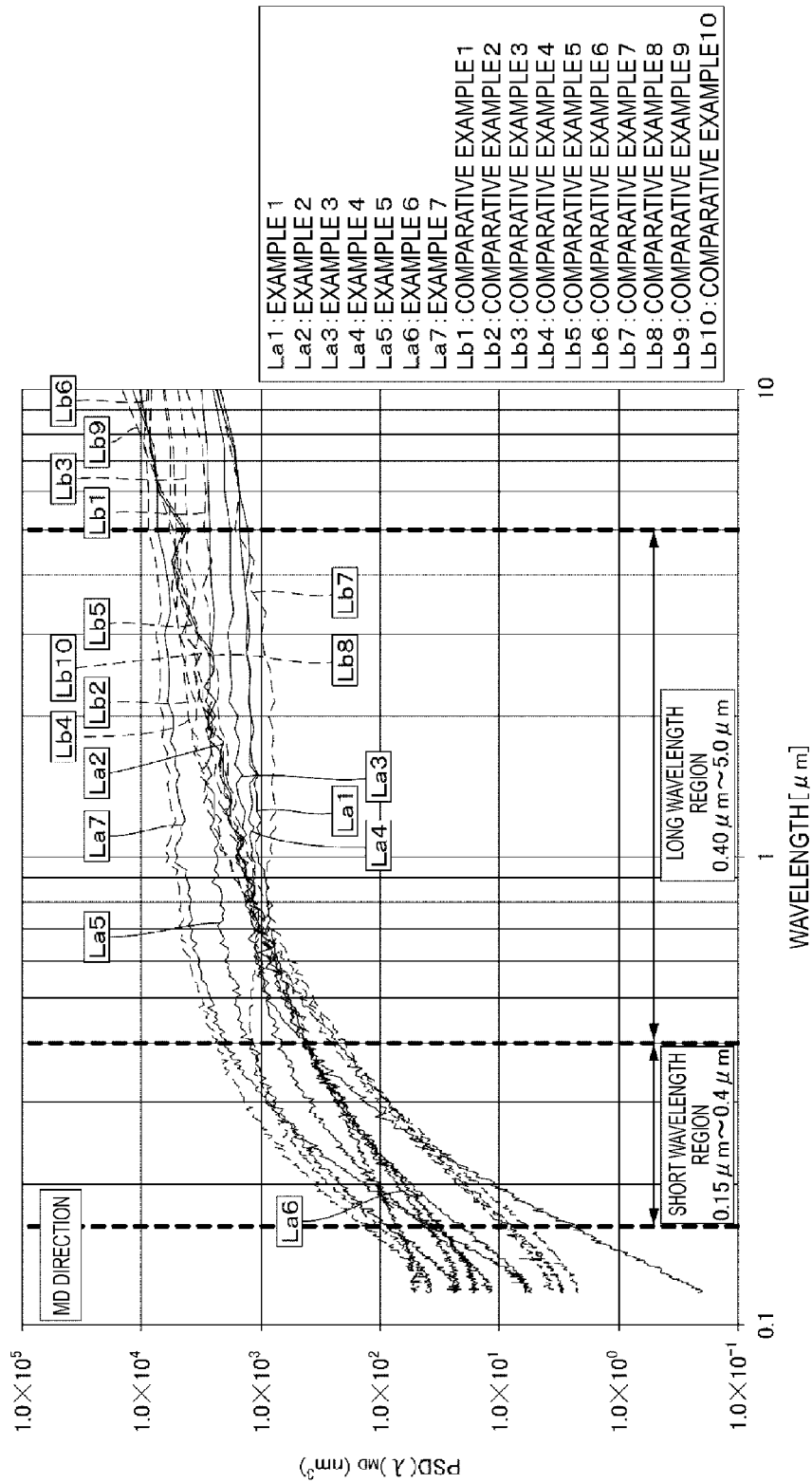
FIG. 7 is a view showing the wavelength dependence of the power spectrum density in the MD direction of each of magnetic tapes of Examples 1 to 7 and Comparative Examples 1 to 10.
Figure 8:
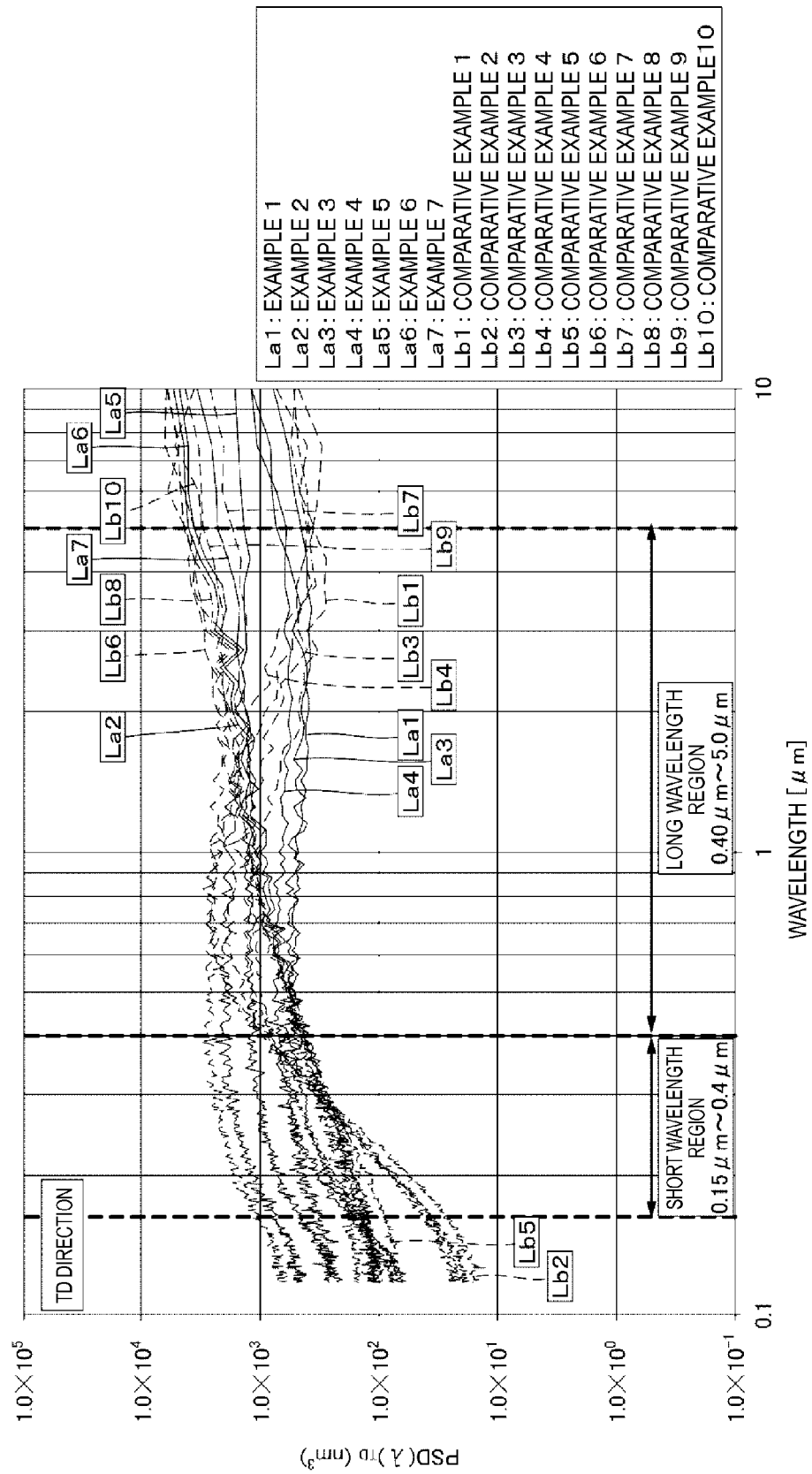
FIG. 8 is a view showing the wavelength dependence of the power spectrum density in the TD direction of each of the magnetic tapes of Examples 1 to 7 and Comparative Examples 1 to 10.

Next, fast fourier transform (FFT) in the MD direction in the 2D surface profile data after subjected to the filter processing was performed in each of 512 lines, and then the power spectrum densities (PSD) of the 512 lines were obtained. Next, the obtained PSDs in the MD direction of the 512 lines were averaged for each wavelength, and then one averaged PSD (hereinafter referred to as "$PSD_{MD}$" or "$PSD(k)_{MD}$") in the MD direction was obtained. Next, the same processing was performed also in the TD direction, and then one averaged PSD (hereinafter referred to as "$PSD_{TD}$" or "$PSD(k)_{TD}$") in the TD direction was obtained. For the averaging of the PSDs in the MD direction and the TD direction, the following expression (1) was used. FIG. 7 and FIG. 8 show the results of converting the $PSD(k)_{MD}$ and the $PSD(k)_{TD}$ obtained as described above to $PSD(\lambda)_{MD}$ and $PSD(\lambda)_{TD}$ ($\lambda$=L/k), respectively.

$$PSD(k)_{MD} (\text{or } PSD(k)_{TD}) = \left( \frac{2d}{N} \left| \sum_{n=0}^{N-1} z(n) \cdot e^{\left(\frac{2\pi i k n}{N}\right)} \right|^2 \right)_{average} \quad (1)$$

PSD: Power spectral density ($nm^3$)
z (n): Surface profile data at point "n" (nm)
d: Resolution (nm)=L/N
L: Measurement length for X (or Y) direction (30 μm)
N: Sampling point number for X (or Y) direction (512 points)
i: Imaginary unit
e: Napier's constant
Average: Averaging operation for Y (or X) direction
n: Variable (0 to N−1)
k: Wave number (0 to N−1)

The X direction corresponds to the MD direction (longitudinal direction) and the Y direction corresponds to the TD direction (lateral direction).

Next, the average value $PSD_{MD,short}$ of the $PSD_{MD}$s and the average value $PSD_{TD,short}$ of the $PSD_{TD}$s in a short wavelength region of 0.15 μm or more and 0.4 μm or less were determined. Next, the average value $PSD_{MD,long}$ of the $PSD_{MD}$s and the average value $PSD_{TD,long}$ of the $PSD_{TD}$s in a long wavelength region of 0.4 μm or more and 5 μm or less were determined.

Next, each determined average value was substituted into the following expressions (2) and (3) to determine the ratios $R_{PSD,long}$ and $R_{PSD,short}$. FIG. 9 shows the results.

Ratio $R_{PSD,long}$=$PSD_{MD,long}$/$PSD_{TD,long}$ (2)

Ratio $R_{PSD,short}$=$PSD_{MD,short}$/$PSD_{TD,short}$ (3)

Evaluation of Arithmetic Average Roughness Ra

First, two-dimensional surface profile data after the filter processing were obtained in the same manner as in "Evaluation of Ratios $R_{PSD,short}$, $R_{PSD,long}$" described above. Next, the arithmetic average roughness Ra was determined using the following expressions (4) to (6). FIG. 10 shows the results.

$$Ra = \frac{\sum_{n=0}^{N-1}\sum_{m=0}^{N-1}|H(m,n)|}{N \times N} \quad (4)$$

$$H(m, n) = Z(m, n) - A \quad (5)$$

$$A = \frac{\sum_{n=0}^{N-1}\sum_{m=0}^{N-1}Z(m,n)}{N \times N} \quad (6)$$

A: Average center surface
N: Sampling point number for X (or Y) direction (512)

Z(m, n): 2D profile data after filter processing at measurement position (m, n)
H(m, n): Difference at measurement position (m, n)
||: Absolute value
m: Variable indicating measurement point in longitudinal direction (0 to 511)
n: Variable indicating measurement point in width direction (0 to 511)
The unit of each of Z (m, n), H (m, n), A, and Ra is "nm".

Evaluation of Recording and Reproducing Properties

First, reproduction signals of the magnetic tapes were obtained using a loop tester (manufactured by Microphysics). The conditions for obtaining the reproduction signals are described below:
Head: GMR head
Speed: 2 m/s
Signal: Single recording frequency (10 MHz)
Recording current: Optimal recording current.

Next, the reproduction signals were captured by a spectrum analyzer in a span of 0 to 20 MHz (Resolution band width=100 kHz, VBW=30 kHz). Next, the peak of the captured spectrum was defined as a signal amount S and floor noise eliminating the peak is integrated to be defined as a noise amount N. Then, a ratio S/N of the signal amount S to the noise amount N was determined as SNR (Signal-to-Noise Ratio). Next, the determined SNR was converted to a relative value (dB) on the basis of SNR of Comparative Example 5 as a reference medium. Table 1 shows the results.

Evaluation of Friction

First, one end of a 30 cm magnetic tape was attached to a tension gauge, a 60 gf weight was attached to the other end, and then the tape was attached to an ArTiC bar at a holding angle of 2°. Next, by moving the tension gauge back and forth to move the magnetic tape back and forth on the ArTiC bar, and then the numerical value (frictional force) of the tension gauge after moving the tape back and forth 10 times was measured. Next, a ratio RF (=($F_B/F_A$)×100 [%]) of frictional force FB of each sample to frictional force FA of Comparative Example 5 as a reference medium was determined. Table 1 shows the results.

Evaluation Results

Table 1 shows the evaluation results of the magnetic tapes of Examples 1 to 7 and Comparative Examples 1 to 10.

TABLE 1

|  | Ra (nm) | $R_{PSD,short}$ | $R_{PSD,long}$ | Recording and reproducing properties (dB) | Frictional force ratio $R_F$ (%) |
| --- | --- | --- | --- | --- | --- |
| Example 1 | 1.36 | 0.39 | 1.88 | 0.5 | 95 |
| Example 2 | 1.72 | 0.57 | 1.37 | 0.4 | 97 |
| Example 3 | 1.92 | 0.11 | 2.27 | 0.3 | 97 |
| Example 4 | 1.53 | 0.55 | 1.54 | 0.4 | 97 |
| Example 5 | 2.06 | 0.53 | 1.67 | 0.2 | 97 |
| Example 6 | 1.68 | 0.63 | 1.51 | 0.4 | 97 |
| Example 7 | 2.82 | 0.36 | 2.13 | 0.1 | 94 |
| Comparative Example 1 | 1.44 | 0.26 | 1.13 | 0.5 | 105 |
| Comparative Example 2 | 1.84 | 0.26 | 0.99 | 0.4 | 105 |
| Comparative Example 3 | 1.63 | 0.25 | 1.06 | 0.5 | 105 |
| Comparative Example 4 | 1.80 | 0.29 | 0.98 | 0.4 | 105 |
| Comparative Example 5 | 1.78 | 0.68 | 1.20 | 0.0 | 100 |
| Comparative Example 6 | 1.73 | 0.79 | 1.14 | −0.5 | 97 |
| Comparative Example 7 | 1.63 | 1.38 | 0.91 | −0.6 | 95 |
| Comparative Example 8 | 1.81 | 0.52 | 1.23 | 0.3 | 103 |
| Comparative Example 9 | 3.20 | 0.42 | 1.88 | −1.1 | 90 |
| Comparative Example 10 | 1.73 | 0.61 | 1.22 | 0.3 | 103 |

Table 1, FIG. 9, and FIG. 10 show the following matter.

In Examples 1 to 7, since Ra 3.0 nm, $PSD_{MD,short}/PSD_{TD,short} \leq 0.65$, and $1.3 \leq PSD_{MD,long}/PSD_{TD,long} \leq 2.3$ are satisfied, the frictional force is smaller than that of Comparative Example 5 which is a reference sample and the recording and reproducing properties are better than those of Comparative Example 5 which is a reference sample.

In Comparative Examples 1 to 4, 8, and 10, since $PSD_{MD,long}/PSD_{TD,long} < 1.3$ is satisfied, the frictional force is larger than that of Comparative Example 5 which is a reference sample.

In Comparative Examples 6 and 7, since $0.65 < PSD_{MD,short}/PSD_{TD,short}$ is satisfied, the recording and reproducing properties are more deteriorated than Comparative Example 5 which is a reference sample.

In Comparative Example 9, 3.0 nm<Ra is satisfied, the recording and reproducing properties are more deteriorated than those of Comparative Example 5 which is a reference sample.

The embodiments of the present technique are specifically described above but the present technique is not limited to the above-described embodiments and can be variously modified based on the technical idea of the present technique.

For example, the configurations, methods, processes, shapes, materials, numerical values, and the like mentioned in the above-described embodiments are merely an example and configurations, methods, processes, shapes, materials, numerical values, and the like different from those in the embodiments may be used if necessary.

The configurations, methods, processes, shapes, materials, numerical values, and the like of the above-described embodiments can be combined without deviating from the scope of the present technique.

The above-described embodiments describe an example in which, by forming a laminated film in such a manner as to follow the irregular surface of the base substance, the arithmetic average roughness Ra, the ratio $PSD_{MD,short}/PSD_{TD,short}$, and the ratio $PSD_{MD,long}/PSD_{TD,long}$ on the surface of the magnetic recording medium satisfy predetermined relational expressions. However, the present technique is not limited to this example and it may be configured so that the arithmetic average roughness Ra, the ratio $PSD_{MD,short}/PSD_{TD,short}$ and the ratio $PSD_{MD,long}/PSD_{TD,long}$ may satisfy predetermined relational expressions by a method other than the method in the above-described embodiments.

Additionally, the present application may also be configured as below.

(1) A magnetic recording medium including:
a surface having a longitudinal direction and a lateral direction,
wherein an arithmetic average roughness Ra, a ratio $PSD_{MD,short}/PSD_{TD,short}$, and a ratio $PSD_{MD,long}/PSD_{TD,long}$ on the surface satisfy the following relational expressions $$Ra \leq 3.0 \text{ nm},$$

$$PSD_{MD,short}/PSD_{TD,short} \leq 0.65, \text{ and}$$

$$1.3 \leq PSD_{MD,long}/PSD_{TD,long} \leq 2.3,$$

wherein $PSD_{MD,short}$ is an average value of PSD values in a range of 0.15 µm or more and 0.4 µm or less in the longitudinal direction of the surface, $PSD_{TD,short}$ is an average value of PSD values in a range of 0.15 µm or more and 0.4 µm or less in the lateral direction of the surface, $PSD_{MD,long}$ is an average value of PSD values in a range of 0.4 µm or more and 5.0 µm or less in the longitudinal direction of the surface, and $PSD_{TD,long}$ is an average value of PSD values in a range of 0.4 µm or more and 5.0 µm or less in the lateral direction of the surface.

(2) The magnetic recording medium according to (1), including:
a base substance containing a polymer resin; and
a laminated film having the surface which is laminated on the base substance.

(3) The magnetic recording medium according to (2),
wherein the base substance has an irregular surface, and
wherein a surface of the laminated film is an irregular surface following the irregular surface of the base substance.

(4) The magnetic recording medium according to (2) or (3),
wherein the laminated film is formed by a sputtering method.

(5) The magnetic recording medium according to any one of (2) to (4),
wherein the laminated film has a seed layer, a foundation layer, and a recording layer, and
wherein the seed layer is provided between the base substance and the foundation layer.

(6) The magnetic recording medium according to (5),
wherein the seed layer has an amorphous state.

(7) The magnetic recording medium according to (5) or (6),
wherein the seed layer contains Ti and Cr, and
wherein a proportion of Ti based on a total amount of Ti and Cr contained in the seed layer is 30 atomic % or more and 100 atomic % or less.

(8) The magnetic recording medium according to (5) or (6),
wherein the seed layer contains Ti, Cr, and O,
wherein a proportion of Ti based on a total amount of Ti and Cr contained in the seed layer is 30 atomic % or more and 100 atomic % or less, and
wherein a proportion of 0 based on a total amount of Ti, Cr, and O contained in the seed layer is 15 atomic % or less.

(9) The magnetic recording medium according to any one of (5) to (8),
wherein irregularities of the surface of the base substance are reduced by the seed layer.

(10) The magnetic recording medium according to any one of (5) to (9),
wherein the foundation layer contains Ru.

(11) The magnetic recording medium according to any one of (5) to (9),
wherein the foundation layer has a first foundation layer and a second foundation layer, and
wherein the first foundation layer is provided on a side of the recording layer and contains Ru.

(12) The magnetic recording medium according to any one of (5) to (11),
wherein the recording layer has a granular structure in which particles containing Co, Pt, and Cr are isolated by oxide.

(13) The magnetic recording medium according to any one of (5) to (12),
wherein the recording layer has an average composition shown in an expression below,

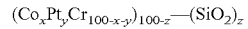

$$(Co_xPt_yCr_{100-x-y})_{100-z}-(SiO_2)_z$$

wherein, in the expression, x, y, and z are values in ranges of 69≤x≤72, 12≤y≤16, and 9≤z≤12, respectively.

(14) The magnetic recording medium according to any one of (5) to (13), further including:
another seed layer provided between the seed layer and the foundation layer.

(15) The magnetic recording medium according to any one of (5) to (14), further including:
a soft magnetic layer provided between the seed layer and the foundation layer.

(16) The magnetic recording medium according to (15),
wherein the soft magnetic layer has a first soft magnetic layer, an intermediate layer, and a second soft magnetic layer, and
wherein the intermediate layer is provided between the first soft magnetic layer and the second soft magnetic layer.

(17) The magnetic recording medium according to (15) or (16), further including:
another seed layer between the soft magnetic layer and the foundation layer.

(18) The magnetic recording medium according to any one of (5) to (17), further including:
a layer containing Co, Cr, and Pt provided on the recording layer.

(19) The magnetic recording medium according to any one of (5) to (18),
wherein the seed layer, the foundation layer, and the recording layer are continuously formed by a Roll to Roll method.

The invention is claimed as follows:

1. A magnetic recording medium comprising:
a surface having a longitudinal direction and a lateral direction,
wherein an arithmetic average roughness Ra, a ratio $PSD_{MD,short}/PSD_{TD,short}$, and a ratio $PSD_{MD,long}/PSD_{TD,long}$ on the surface satisfy the following relational expressions $Ra \leq 3.0$ nm, $PSD_{MD,short}/PSD_{TD,short} \leq 0.65$, and $1.3 \leq PSD_{MD,long}/PSD_{TD,long} \leq 2.3$, wherein $PSD_{MD,short}$ is an average value of PSD values in a range of 0.15 μm or more and 0.4 μm or less in the longitudinal direction of the surface, $PSD_{TD,short}$ is an average value of PSD values in a range of 0.15 μm or more and 0.4 μm or less in the lateral direction of the surface, $PSD_{MD,long}$ is an average value of PSD values in a range of 0.4 μm or more and 5.0 μm or less in the longitudinal direction of the surface, and $PSD_{TD,long}$ is an average value of PSD values in a range of 0.4 μm or more and 5.0 μm or less in the lateral direction of the surface.

2. The magnetic recording medium according to claim 1, comprising:
a base substance containing a polymer resin; and
a laminated film having the surface which is laminated on the base substance.

3. The magnetic recording medium according to claim 2, wherein the base substance has an irregular surface, and
wherein a surface of the laminated film is an irregular surface following the irregular surface of the base substance.

4. The magnetic recording medium according to claim 2, wherein the laminated film is formed by a sputtering method.

5. The magnetic recording medium according to claim 2, wherein the laminated film has a seed layer, a foundation layer, and a recording layer, and
wherein the seed layer is provided between the base substance and the foundation layer.

6. The magnetic recording medium according to claim 5, wherein the seed layer has an amorphous state.

7. The magnetic recording medium according to claim 5, wherein the seed layer contains Ti and Cr, and
wherein a proportion of Ti based on a total amount of Ti and Cr contained in the seed layer is 30 atomic % or more and 100 atomic % or less.

8. The magnetic recording medium according to claim 5, wherein the seed layer contains Ti, Cr, and O,
wherein a proportion of Ti based on a total amount of Ti and Cr contained in the seed layer is 30 atomic % or more and 100 atomic % or less, and
wherein a proportion of O based on a total amount of Ti, Cr, and O contained in the seed layer is 15 atomic % or less.

9. The magnetic recording medium according to claim 5, wherein irregularities of the surface of the base substance are reduced by the seed layer.

10. The magnetic recording medium according to claim 5, wherein the foundation layer contains Ru.

11. The magnetic recording medium according to claim 5, wherein the foundation layer has a first foundation layer and a second foundation layer, and
wherein the first foundation layer is provided on a side of the recording layer and contains Ru.

12. The magnetic recording medium according to claim 5, wherein the recording layer has a granular structure in which particles containing Co, Pt, and Cr are isolated by oxide.

13. The magnetic recording medium according to claim 5, wherein the recording layer has an average composition shown in an expression below, $(Co_xPt_yCr_{100-x-y})_{100-z}—(SiO_2)_z$ wherein, in the expression, x, y, and z are values in ranges of $69 \leq x \leq 72$, $12 \leq y \leq 16$, and $9 \leq z \leq 12$, respectively.

14. The magnetic recording medium according to claim 5, further comprising:
another seed layer provided between the seed layer and the foundation layer.

15. The magnetic recording medium according to claim 5, further comprising:
a soft magnetic layer provided between the seed layer and the foundation layer.

16. The magnetic recording medium according to claim 15,
wherein the soft magnetic layer has a first soft magnetic layer, an intermediate layer, and a second soft magnetic layer, and
wherein the intermediate layer is provided between the first soft magnetic layer and the second soft magnetic layer.

17. The magnetic recording medium according to claim 15, further comprising:
another seed layer between the soft magnetic layer and the foundation layer.

18. The magnetic recording medium according to claim 5, further comprising:
a layer containing Co, Cr, and Pt provided on the recording layer.

19. The magnetic recording medium according to claim 5, wherein the seed layer, the foundation layer, and the recording layer are continuously formed by a Roll to Roll method.

20. The magnetic recording medium according to claim 16,
wherein the first soft magnetic layer and the second soft magnetic layer are exchange-coupled in an antiparallel manner.

* * * * *